…

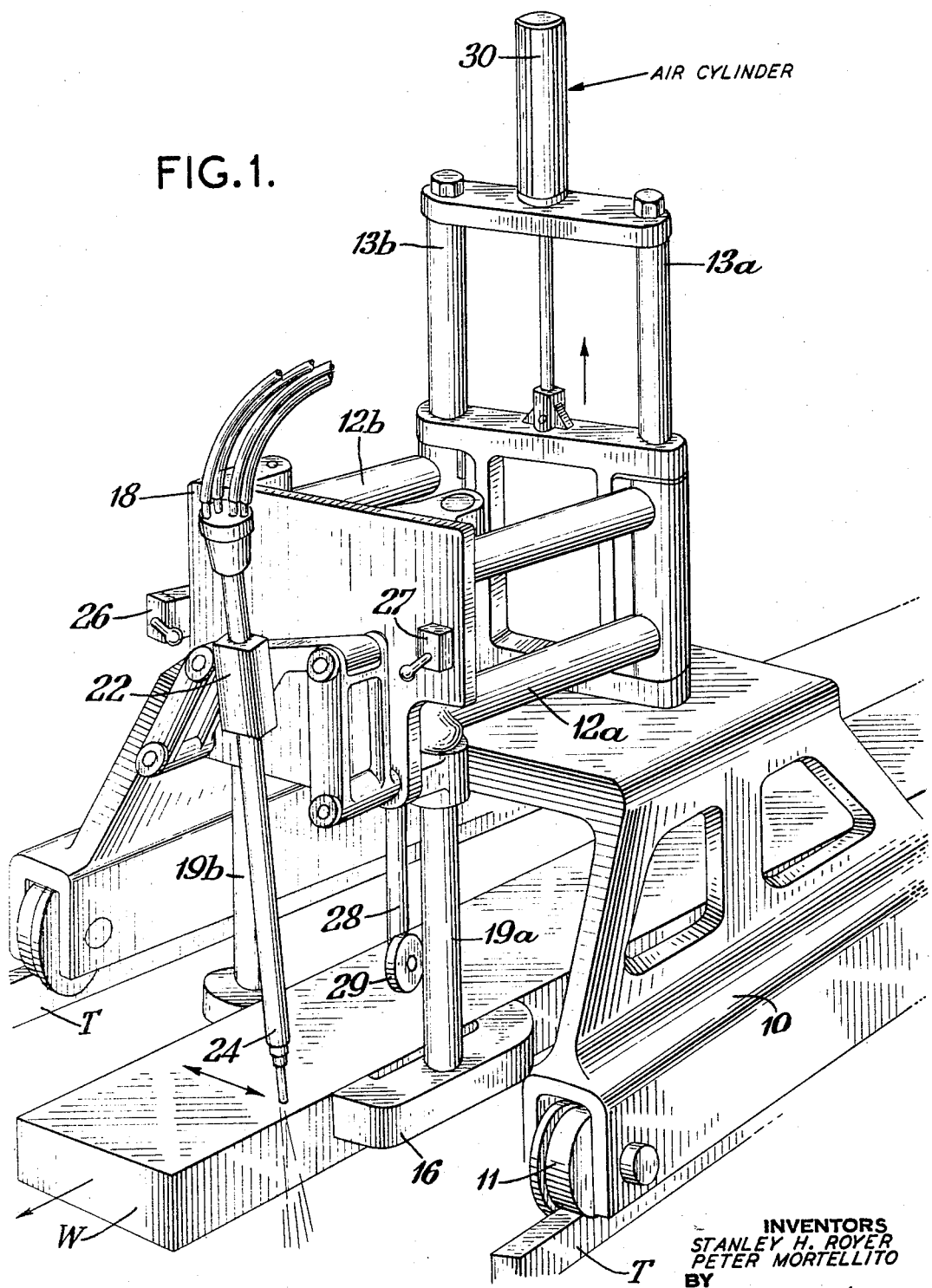

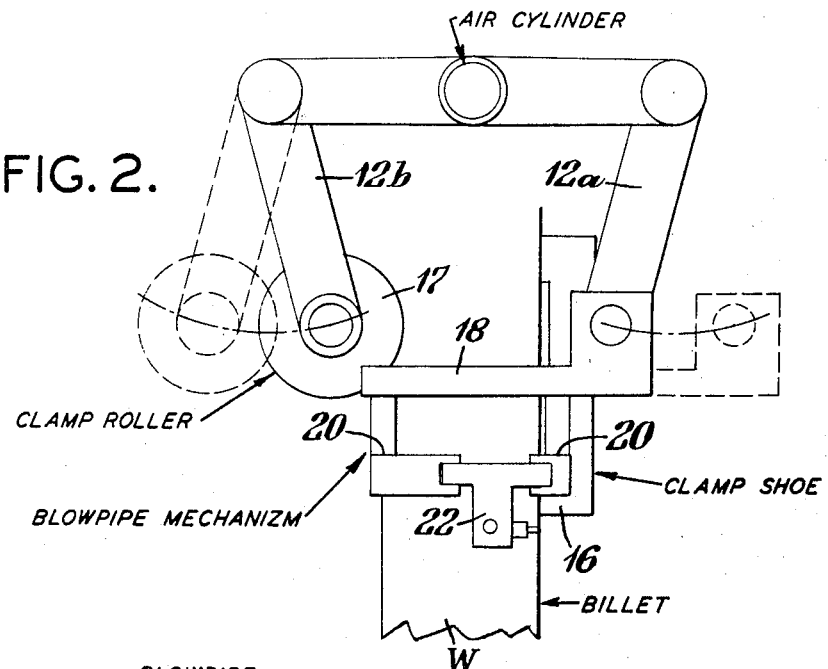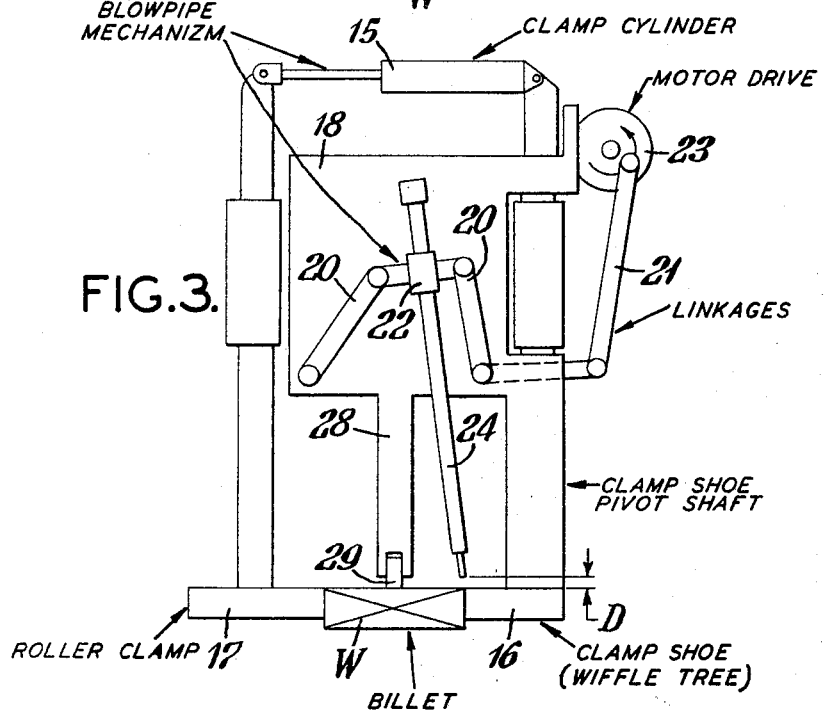

3,403,896
APPARATUS FOR UNIFORMLY CUTTING A MOVING METAL BODY REGARDLESS OF CAMBER THEREIN
Peter Mortellito, Jersey City, and Stanley H. Royer, Elizabeth, N.J., assignors to Union Carbide Corporation, a corporation of New York
Filed May 11, 1966, Ser. No. 549,315
7 Claims. (Cl. 266—23)

This invention relates to an apparatus for cutting a moving metal body and while not limited thereto, is particularly well suited for use in conjunction with a continuous casting process producing billets, blooms and the like.

In the production of continuously cast metal bodies, the final product is pulled away from the casting mold as fresh molten metal is added to the tundish supplying the mold. In order to maintain the process continuous, the solidified metal leaving the mold must be rapidly severed from the main stream and carried away without interrupting the flow of the molten metal into the casting mold. This requires the solidified product to be rapidly cut off while such product is moving. The cutting apparatus must therefore be capable of moving with the metal product during the cutting operation.

Frequently, the same steel mill will produce different sized metal bodies, and therefore the same cutting apparatus should have the ability to rapidly adjust itself for the cutting of material within a range of widths and thicknesses.

Still another important requirement of the steel mill is that the metal body must be cut squarely, regardless of slight misalignment of the body with respect to the cutting apparatus or camber in the metal body. This requirement is difficult to fulfill with cutting machines of the conventional traversing carriage type wherein the cutting torch is mounted upon a carriage which rides in tracks across the path of movement of the workpiece, at right angles to the main frame of the machine which supports such carriage. While the traversing carriage travels a fixed path with respect to the main frame of the machine, e.g., at right angles thereto, it does not always travel a fixed path wth respect to the metal body being cut. For example, if the machine was designed for producing square cut ends and the metal body had substantial camber, the machine would not produce a square cut across the metal body.

Another drawback to the use of a cutting machine of the traversing carriage type for severing continuously cast material is that considerable time is lost in accurately positioning the cutting torch to commence the cutting operation adjacent the corner formed by the top and side surfaces of the workpiece, particularly when there is a change of size in the product being produced.

For efficient oxy-fuel cutting of metal bodies, the torch must be accurately positioned in order to direct the flames at the intersection of the top and side surfaces of the body. However, due to the normal overtravel of the carriage drive, exact positioning of the torch cannot usually be accomplished in a rapid manner with machines of this type.

Still another drawback to the coventional carriage type cutting machines is that the longitudinal movement of the machine must be synchronized with the speed of the roll table moving the workpiece. This ordinarily requires complicated electrical controls and circuitry to drive the separate carriage motors at the same speed as the roll table carrying the metal body.

These and still other disadvantages make the conventional carriage type cutting machines generally unsuitable for use in conjunction with the overall continuous casting process, particularly when producing billets and blooms of varying dimensions.

It is an object of the invention to provide an apparatus for rapidly cutting off lengths of a moving metal body, without interrupting the movement of same.

Another object is to provide a cutting apparatus which does not require separate drive means for longitudinally moving the machine in synchronism with the speed of the moving metal body.

Still another object is to provide a flame-cutting apparatus for rapidly cutting off lengths of a moving metal body wherein the cutting torch is rapidly positioned automatically at the start of each cutting pass to direct oxy-fuel flames at the corner formed by the top and side surfaces of the metal body.

Yet another object is to provide an apparatus for cutting a moving metal body wherein the angle of cut with respect to the center line of the body can be maintained constant regardless of camber therein.

A yet more specific object of the invention is to provide an apparatus for cutting a moving metal body wherein consistently square cuts can be made rapidly regardless of camber in the body and regardless of a slight misalignment of the body with respect to the main frame of the cutting apparatus.

Still further objects and advantages of the invention will become readily apparent to those skilled in the art from the remainder of the specification, the drawings and the appended claims.

In the drawings:
FIGURE 1 is an isometric view of the apparatus of the invention illustrating the cutting cycle at a point wherein the clamping means have just engaged the sides of the metal body to be cut;
FIGURE 2 is a plan view of the apparatus shown in FIGURE 1; and
FIGURE 3 is a front elevational view of the apparatus shown in FIGURE 1.

According to the invention, apparatus is provided for cutting off lengths of a moving metal body and consists of a movable main frame adapted to straddle the metal body and move in the same longitudinal direction as the body. A pair of sizing arms are pivotally mounted upon the main frame. Each of these arms has a clamping means connected to it for engaging the sides of the metal body as the arms are moved from a retracted to a closed position about the body. One of the sizing arms has a vertical carrier plate connected to it which moves in unison with the arms as it pivots about the main frame. The carrier plate acts as a support for movable float links which extend outwardly from it. These float links in turn have a cutting tool support mounted upon them for positioning a cutting tool, e.g., an oxy-fuel torch, in a vertical position adjacent the top surface of the body. Drive means are provided for moving the float links, which in turn produces a movement of the cutting tool transversely of the metal body and in a path substantially parallel to the surface thereof.

Preferably, the sizing arm supporting the carrier plate has a rotatable shaft, rotatable about a vertical axis, to one end of which the carrier plate is attached. The opposite end of this shaft has a clamping shoe fixed to it for engaging the side of the metal body. The effect of this construction is that if the clamping shoe turns to adjust to camber in the metal body, the carrier plate and the cutting tool supported therefrom will also turn with the shoe. This will allow the cutting tool to follow a path at a fixed angle to the shoe and to the side of the workpiece, thus enabling constant angle cuts, e.g., square cuts, to be produced regardless of camber. The cutting tool is also preferably fixedly aligned with its cutting tip adjacent the face of the clamping shoe at the beginning of its cutting stroke. In this manner the cutting device will always be exactly positioned at the corner of the metal body when the clamping shoe contacts the side of the body as the sizing arms are moved from a retracted to a closed position.

Referring now to the drawings and particularly to FIG. 1, the apparatus consists of a movable main frame 10 adapted to straddle the moving metal body W to be cut. The entire frame 10 is movable longitudinally on wheels 11 riding on tracks T, which are laid out parallel to the path of movement of the metal body W. Secured to the top of main frame 10 is a pair of vertical shafts 13a and 13b respectively which act as pivotal mounts for a pair of sizing arms 12a and 12b respectively. The sizing arms 12a and 12b move pivotally inward to close on and outward to retract away from the sides of metal body W in response to the movement of air cylinder 15. Each of the sizing arms has a clamping means associated with it for engaging the opposite sides of the metal body. Preferably one of the sizing arms, e.g., sizing arm 12a, has a clamping shoe 16 connected to it as a clamping means while the opposite sizing arm, e.g., arm 12b, has a clamping roller 17 connected thereto as its clamping means. The advantage of utilizing a shoe clamp on one side of the workpiece and a roller clamp on the other is that the clamping action will be smoother than if a shoe type clamp were utilized exclusively.

Each of the sizing arms 12a and 12b includes a vertical shaft 19a and 19b respectively to which the clamping means 16 and 17 are affixed. The vertical shaft 19a is rotatable about its vertical axis. Mounted upon the upper end of the shaft 19a is a vertical carrier plate 18. As will be explained hereinafter, a rotational movement of the clamping shoe 16 and shaft 19a will produce a corresponding rotational movement of the carrier plate 18. Also, since the vertical shaft 19a is a part of sizing arm 12a, the carrier plate 18 will also move in unison with the sizing arm 19a as the same moves from a retracted to a closed position about the metal body W.

Rotatably mounted upon carrier plate 18 are movable float links 20 which carry a cutting tool support 22, to which may be connected a cutting tool 24, e.g., an oxyfuel flame cutting blowpipe. The float links 20 and cutting blowpipe 24 are preferably aligned so that the tip of the cutting blowpipe is in line with the contacting face of clamping shoe 16 when the sizing arms are retracted. In this manner, the top of the blowpipe 24 will be in alignment with the side of the metal body to commence the cutting operation when the clamping shoe 16 contacts the side thereof. The float links 20 are connected by a bell crank type linkage 21 to a drive means 23, such as an electric motor. The movement of the float links 20 by the drive means 23, produces a transverse movement of the cutting tool 24 across the top surface of the metal body W, and in a path substantially parallel thereto. In other words the distance D as shown in FIGURE 3 between the tip of the cutting blowpipe 24 and the top surface of the metal body remain substantially constant as the blowpipe is moved across the surface of the body W from its starting position as shown in FIGURE 3 to the opposite side thereof.

The movement of the blowpipe 24 is controlled to correspond to the width of the metal body W by a limit switch 26 connected to the sizing arm 26. A second limit switch 27 is also preferably connected to the sizing arm 12a to stop the drive means 23 so that the blowpipe tip will again be in line with the face of clamping shoe 16.

The sizing arms 12a and 12b, the clamping means 16 and 17 and the cutting blowpipe and support 22 are all vertically adjustable to the thickness of the metal body W by means of vertical air cylinder 30 which lifts and lowers the sizing arms over vertical shafts 13a and 13b respectively. The precise height of the same is regulated by a roller 29 connected to the lower end of a finger 28 which in turn is connected to the carrier plate 18.

In operation, as the metal body W passes under the main frame 10 of the apparatus, the sizing arms 12a and 12b are in a retracted position as shown by the dotted lines in FIGURE 2. At a predetermined time delay, dependent upon the length of the body to be severed, and after the vertical air cylinder 30 has been adjusted to the thickness of the body, the clamping means 16 and 17 engage the opposite sides of the moving metal body W. When the clamping means engage the body, the entire apparatus is pulled along the tracks T by the moving metal body. This feature eliminates the need for separate drive motors for propelling the main frame 10 along the tracks T and for complicated electrical controls for synchronizing the speed of the main frame with that of the moving metal body.

Adjustment of the vertical air cylinder 30 is effected in order to lower the clamping means and cutting blowpipe such that the roller 29 contacts the top surface of the body.

If the center line of the metal body is out of line with the cutting machine, or if there is substantial camber in the body, one edge of the clamping shoe 16 will contact the side of the body. In so doing, the clamping shoe 16 will rotate the vertical shaft 19a until both contacting faces of the shoe engages the side of the body. As the shaft 19a rotates, it causes a corresponding rotational movement of the carrier plate 18 and the cutting tool 24 supported therefrom. In this manner, the cutting tool 24 will still travel a path at a fixed angle to the center-line of the metal body, e.g., at a right angle thereto so as to produce a square cut. An electrical sequence controller (not shown) or other similar means actuates gas and oxygen valves to supply the cutting gases to the blowpipe 24 as soon as the clamping means engages the sides of the body. As previously explained, at the start of the cutting operation, the tip of the blowpipe will be positioned so as to direct its flames at the corner formed by the intersection of the top and side surfaces of the metal body, as shown in FIGURES 1 and 3.

At a predetermined time thereafter, which is immediately after a cutting reaction has commenced, the drive means 23 is supplied with power to rotate the bell crank type linkage 21, which in turn causes movement of the float links 20. In so doing, the blowpipe is moved across the surface of the metal body in a path substantially parallel with the surface thereof.

When the cutting tool 24 traverses the entire width of the body, it trips a limit switch 26, which through suitable electrical circuitry reverses the direction of the drive means 23 so as to return the blowpipe to its original starting position. When the blowpipe energizes the second limit switch 27, it breaks the electrical circuit to the drive means 23 so as to stop the blowpipe at a point in line with clamp 16. At the same time, limit switch 26 when actuated also energizes an electrical circuit to retract the sizing arms 12a and 12b to a retracted position. The entire frame 10 is then shifted longitudinally to its original position and the machine is ready for another cycle to cut off additional lengths of the moving body.

What is claimed is:

1. Apparatus for cutting off lengths of a moving metal body which comprises:

(a) a movable main frame adapted to straddle said metal body, (b) a pair of sizing arms pivotally mounted upon said frame, each of said sizing arms having clamping means attached thereto for engaging opposite sides of said moving metal body, one of said sizing arms comprising a shaft rotatable about a vertical axis, the clamping means attached to said shaft comprising a clamping shoe, (c) a vertical carrier plate connected to the sizing arm comprising said rotatable shaft for movement in unison therewith, said carrier plate being mounted upon one end of said shaft and the clamping shoe being affixed to the opposite end thereof whereby rotational movement of said clamping shoe will produce a corresponding movement of said carrier plate, (d) a cutting tool movably attached to said carrier plate and positioned in a generally vertical direction adjacent the top surface of said metal body and in such manner that said cutting tool can move transversely of the metal body in a direction substantially parallel to the top surface thereof, and (e) drive means for moving said cutting tool.

2. Apparatus as claimed in claim 1 wherein said cutting tool is attached to said carrier plate by being connected to a cutting tool support which in turn is connected to movable float links rotatably mounted upon said carrier plate.

3. Apparatus as claimed in claim 1 including a limit switch attached to at least the sizing arm opposite the sizing arm supporting said carrier plate for limiting the movement of the cutting device to the width of the metal body.

4. Apparatus as claimed in claim 1 wherein said carrier plate is affixed to said shaft at a right angle to said clamping shoe, whereby said cutting tool will produce a square cut across the metal body regardless of camber therein.

5. Apparatus as claimed in claim 1 wherein said sizing arms and clamping means are vertically adjustable to the thickness of the metal body by a roller suspended from said carrier plate.

6. Apparatus as claimed in claim 1 wherein said clamping means comprises a clamping shoe attached to one of said sizing arms and a clamping roller attached to the other of said sizing arms.

7. Apparatus as claimed in claim 1 wherein said cutting tool comprises an oxy-fuel flame cutting blowpipe which is positioned with its torch tip in alignment with the contacting face of said clamping shoe whereby the cutting torch will be in alignment with the side of the metal body to commence the cutting operation when said clamping shoe contacts the side thereof.

References Cited

UNITED STATES PATENTS 2,484,897  10/1949  Lytle.
3,291,470  12/1966  Lotz _____ 266—23

J. SPENCER OVERHOLSER, *Primary Examiner.*

R. D. BALDWIN, *Assistant Examiner.*